UNITED STATES PATENT OFFICE.

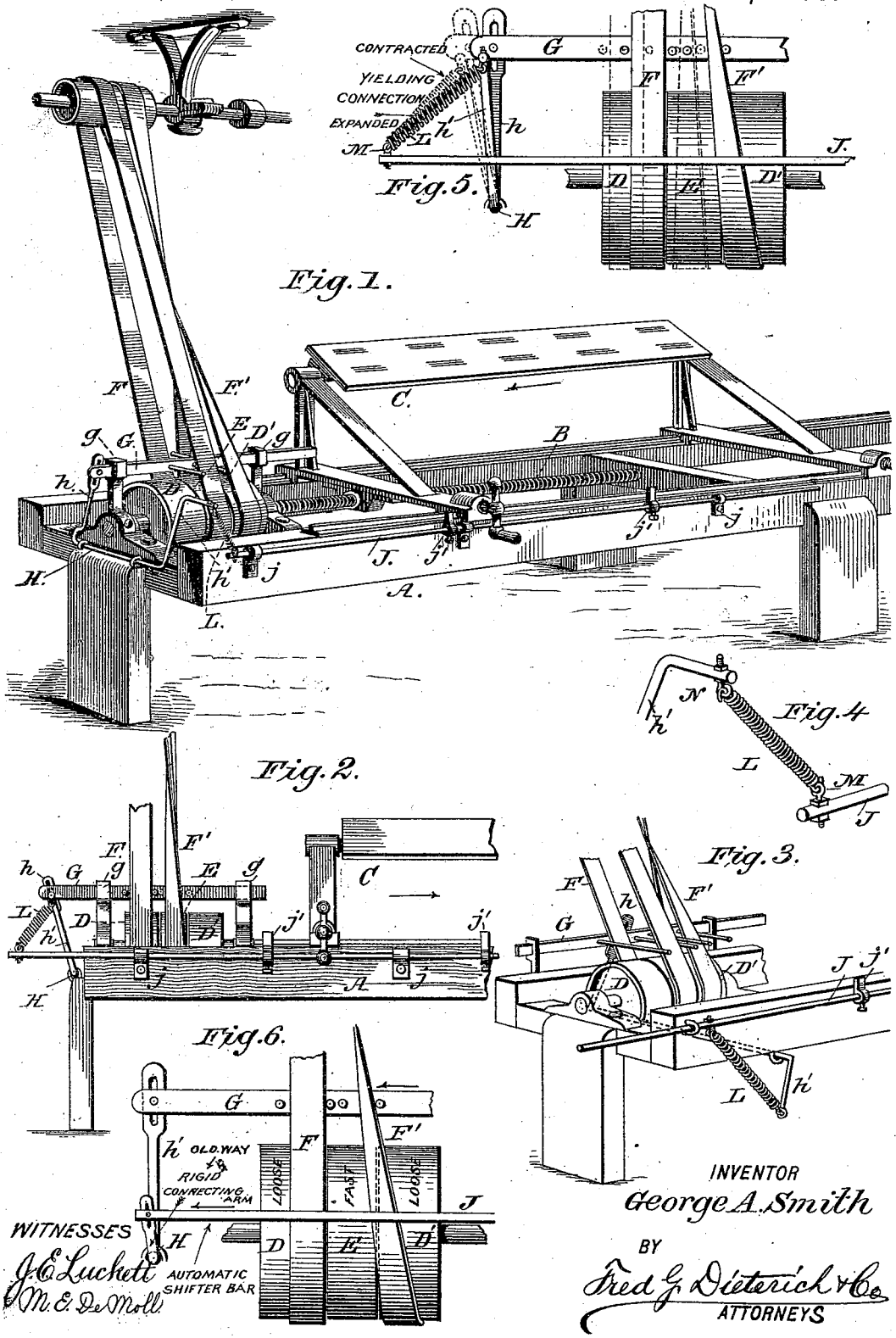

GEORGE A. SMITH, OF COHOKE, VIRGINIA, ASSIGNOR TO THE COHOKE WOODEN-WARE MANUFACTURING COMPANY.

AUTOMATIC BELT-SHIFTING MECHANISM.

SPECIFICATION forming part of Letters Patent No. 549,298, dated November 5, 1895.

Application filed July 20, 1895. Serial No. 556,646. (No model.)

*To all whom it may concern:*

Be it known that I, GEORGE A. SMITH, residing at Cohoke, in the county of King William and State of Virginia, have invented a new and Improved Automatic Belt-Shifting Mechanism, of which the following is a specification.

My invention more especially relates to improvements in that class of belt-shifting devices in which the operating-shaft has a central fixed or drive pulley and a pair of loose pulleys, a straight and a crossed belt, and in which the bar is automatically shifted by a movable portion of the machine operated by the operating-shaft—such as, for instance, the reciprocating carriage of a knife-grinding machine or planing-machine. I desire it understood, however, that while my invention is more especially adapted for use in connection with an automatically-reciprocated operating rod or bar, its use is also applicable and useful in connection with a hand-operated bar.

In the practical application of belt-shifting devices of the class above described the belt-engaging members are shifted laterally by suitable means connected with the operating rod or bar by a rigid member, by means of which the belt-shifting member is reciprocated.

From practical experience with this class of shifting devices I have found that the action thereof is not positive, and frequently is such, especially when shifting the crossed belt from the loose to the fixed pulley, as to leave both belts upon the loose pulleys, and in consequence cause a complete stoppage of the machine at each end of the reciprocal stroke of the carriage or other movable body operated by the drive-shaft. This stoppage generally occurs when the vibrating or swinging arm, which operates the belt members, (when such device is used,) is at or near a dead-center, and when the relation of the belts simultaneously is such that the belt last on the fixed drive-pulley has been shifted to the loose pulley and the other belt has not yet fully or partly left the loose pulley, thereby leaving both belts upon the loose pulleys, causing, as it were, a stoppage of the drive-shaft and, in consequence, a stoppage of further movement of the belt-shifting mechanism. This objectionable feature I positively overcome by the use of my invention, which primarily has for its object to provide a belt-shifting mechanism comprising means which will automatically finish the shift or impart the final movement of the stroke of the vibrating member or other belt-throwing means irrespective of the further movement of the operating rod or bar after the belt last on the fast pulley is shifted from engagement therewith.

My invention also has for its object to provide a belt-shifting mechanism in which the shifting action will be positive and continuous irrespective of the position of the belts on the pulleys or the action of the operating rod or bar after such bar will have brought the vibrating or shifting member to or near a dead-center or other predetermined position.

Furthermore, my invention has for its object to provide a belt-shifting mechanism comprising means which, when acted upon by the first part of the movement of the operating rod or bar, will store up power sufficient to cause the vibrating arm to move continuously to the completion of its stroke as the operating rod or bar stops.

With other objects in view, which hereinafter will be referred to, my invention consists in a shifting mechanism embodying the peculiar combination and novel arrangement of parts, such as will be first described in detail and then be specifically pointed out in the appended claims, reference being had to the accompanying drawings, in which—

Figure 1 is a perspective view of a grinding-machine with my improved belt-shifting mechanism applied, the belts being adjusted to move the carriage to the position indicated by the arrow. Fig. 2 is a side elevation of the machine with my improvements applied, the belts being set to move the carriage in a direction opposite to that shown in Fig. 1. Fig. 3 is a view illustrating a different way of arranging such mechanism. Fig. 4 is a detail view illustrating the manner of connecting the vibrating arm and the operating rod or bar and the means for adjusting the normal tension of the spring. Fig. 5 illustrates a position of the belts and the vibrating arm in full lines, and the position to which they are brought by the yielding connection in dotted lines, such position being attained instantly after the carriage and operating-shaft is momentarily stopped and the fast pulley free of either of the belts. Fig. 6 is a similar view illustrating an old form of shifting devices in which the vibrating member and operating rod or bar are connected by a rigid member and illustrating the position the belts frequently assume when the vibrating arm is at or near a dead-center, and at which position it remains until shifted farther by hand when such rigid connection is used.

Referring now to the accompanying drawings, A indicates the main frame of the grinding, planing, or other machine; B, the main drive-shaft or feed-screw therefor; C, the carriage or reciprocating portion; D D', the loose pulleys; E, the central or fast pulley, and F F' the straight and crossed belts, respectively, all of which may be of any ordinary construction and will hereinafter be therefore only referred to in a general way.

The belt-shifting devices, in the preferred form, are arranged as shown in Fig. 1, and comprise a laterally-movable belt shifting member or bar G, held to reciprocate in bearings $g\ g$, projected up from the main frame of the machine, as clearly shown. To the front end of this bar G is pivotally connected the inner crank end $h$ of a rocker or vibrating member H, which has a corresponding crank-arm $h'$ on the outer end, such arms $h$ and $h'$ in the construction shown in said Fig. 1 projecting upward.

J indicates the reciprocating operating rod or bar, which in the preferred form is held to reciprocate in bearings $j\ j$ on one of the side beams of the main frame, and has adjustable stops $j'\ j'$ which are adapted to be engaged by the carriage at the end of each reciprocal movement thereof, as clearly shown in Fig. 1.

L indicates a yielding or elastic connection, such as a stout coil spring, the ends of which are connected to eyes M and N, which are adjustably connected to the operating rod or bar J and to the upper end of the vibrating arm $h'$, such adjusting means being provided to regulate the normal tension of the spring L. This spring L, it will be observed, forms a yielding connection between the arm $h'$ and the reciprocating operating rod or bar J, the normal tension of which can be readily adjusted by setting the eyes M and N, as desired, which tension, however, it should be stated, is further and materially increased by the last portion of each stroke of the operating rod or bar J, which increased tension forms the stored-up power or energy utilized to continue or complete the shifting action of the vibrating arm and shifting member H. This operation is best explained as follows: The parts being in the position shown in Fig. 1, and the carriage traveling in the direction indicated by the arrow, and the spring inclined toward the rear end of the machine. Now it will be readily seen that as the carriage above reaches the end of its reciprocal movement indicated, it engages the stop $j'$ and pulls the operating rod or bar in the same direction, which, as it thus moves, carries the spring L to the diagonal or inclined position, directly reverse to that shown in Fig. 1, the yielding condition of the spring member L permitting it to assume such position without affecting the arm $h'$. After reaching this latter position, however, further movement of the bar J will cause the spring to pull or bear upon the arm $h$, and in consequence rock the member H and move the bar G and begin to shift the belts. At this point, it should be stated, the normal tension of the spring L is less than the frictional resistance of the belts on the pulleys. It will thus be seen that as the bar or rod J continues in its movement it will first draw out the spring and increase its tensile pull-strain to a point sufficient to overcome the frictional resistance of the belts on the pulleys, especially that of the belt on the fast pulley. When this occurs, it is manifest the member L becomes a pull member and serves to rock the arm $h'$ as the bar J pulls it in the direction of its (the bar J) movement. Thus it will be seen the tensile and retractile qualities of the spring correspondingly increase as such spring is drawn out, and a stored-up power obtained by the said increased tension of the spring, which in itself becomes more effective with the decrease of frictional resistance produced by the drive-belt as it leaves the fast pulley, such conditions serving to cause a positive movement of the members H and G to their final stroke the instant the last drive-belt leaves the fast pulley, no matter whether the operating-shaft and its reciprocating carriage continues in their movement or come to a momentary stoppage at each reversal of movement of the machine, it being obvious that the belt moving from the loose pulley onto the fast pulley produces no resistance to the movement of the bar G, but, on the contrary, serves when partly moved onto the fast pulley to aid such bar in its final movement.

By reference to Figs. 5 and 6 the general operation of my invention will be readily understood. In Fig. 6 I have shown a position the belts frequently assume, in the arrangement of shifting devices having a rigid connecting-arm, during the shifting operation, the slow or impeded movement of the cross-belt being caused by the irregular manner in which the shifting-fingers engage the belts and the twist or turn movement of the crossed belt. Now, were the vibrating or rocker member H connected to the bar J by a rigid member, as shown in Fig. 6, it will be manifest that as the belt assumes the position shown the shifting devices would also come to a standstill and leave the belts on the loose pulleys. Now, when the devices are constructed with a yielding or elastic connecting member, as shown in Fig. 5, it will be clear that should the several parts be in the position shown in full lines and the machine come to a stop, by the absence of a belt on the fast pulley, the stored-up power or energy—i. e., the tension of the spring—will swing the vibrating member H to a further stroke and pull the cross-belt onto the fast pulley, as indicated in dotted lines.

While I have shown my improvements as applied to a knife-grinding machine, it is manifest that the same may be employed in connection with any machine for which the class of shifting devices above referred to are adapted for use. Furthermore, the same may be used in connection with a hand-operated bar, as the spring connection will act upon the member H as soon as the said bar reaches a predetermined point, and the increased tension produced by the drawing out of the spring is greater than the frictional resistance of the belts.

From the foregoing description it will be manifest that as one belt is removed from the fast pulley by a direct action of the machine, and the machine in consequence is stopped, the other belt will be shifted onto the fast pulley by automatic means, which operate entirely independent of and without any action of the machine whatever, such automatic power having been stored up by the operation of the machine as the last drive-belt is moved from the fast pulley.

It will also be noticed that it is only necessary to employ one yielding connection, as the spring L, connecting the rod or bar J, and the rocking member H is shifted back and forth, as most clearly shown in Figs. 1 and 2. Thus in Fig. 1 the spring is thrown over to the position shown in Fig. 2 before it becomes distended and operates, and after it operates in this position it returns to the position shown in Fig. 1 before it operates to reshift the belts.

Having thus described my invention, what I claim, and desire to secure by Letters Patent, is—

1. In a device of the character described, the combination with the pulleys and belts of the shifting bar, the vibrating or rocking member, for operating the same, the operating rod or bar, and an elastic connection between said member and bar, said elastic connection being adapted to receive power or energy through the operating rod and transmit the same to the vibrating member, the force or energy of said connection exceeding the frictional resistance between the belts and pulleys, substantially as shown and described.

2. The combination with the pulleys and belts, of a shifting member, adapted to move said belts, the vibrating or rocking member for operating said shifter, the operating rod or bar, and the single elastic or yielding connection between the end of the vibrating member and operating rod, said elastic or yielding member being adapted to operate when said operating rod moves in either direction substantially as shown and described.

3. A belt shifting mechanism as described, the combination with the drive shaft the fast and loose pulleys, and the crossed and straight belts, of an operating rod or bar automatically and intermittently reciprocated, a vibrating or rocker member, laterally movable shifter member operated by the oscillation of the rocker member and a coil spring connection between such member and the operating rod or bar substantially as shown and for the purposes described.

4. The combination in a belt shifting mechanism as described, of the belt shifting rocker member the operating rod or bar, the spring L, and the adjustable eyes M and N connecting the said spring to the operating rod or bar and rocker member all arranged substantially as shown.

5. The combination with a drive shaft having a pair of loose pulleys and an intermediate fast pulley, a straight and crossed belt held to engage the same, of a reciprocating operating rod or bar, a reciprocating belt shifting member, an oscillating member for moving such belt engaging member laterally, said oscillating member having a crank arm and a spring connecting the said crank arm the operating rod or bar, having a normal tensile strain less than the normal frictional resistance of the belts when one of such belts is applied on the fast pulley as set forth.

6. The combination with the drive shaft, the pulleys thereon, the belts, and the operating rod or bar J, actuated from the said drive-shaft, of the member G having oppositely projecting belt engaging fingers, the rocking member H, connected with the member G having a crank arm $h'$ and the yielding connection joining the rocking member H and the shifting bar, all arranged substantially as shown and described.

GEORGE A. SMITH.

Witnesses:
FRED G. BARBEE,
FRED. G. DIETERICH.